(12) United States Patent
Nguyen et al.

(10) Patent No.: US 9,337,914 B2
(45) Date of Patent: May 10, 2016

(54) SYSTEM AND METHOD FOR COMMUNICATING WITH A PORTABLE ELECTRONIC DEVICE

(71) Applicant: BlackBerry Limited, Waterloo (CA)

(72) Inventors: Nam Nguyen, Irving, TX (US); Yufei Blankenship, Rolling Meadows, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 406 days.

(21) Appl. No.: 13/686,515

(22) Filed: Nov. 27, 2012

(65) Prior Publication Data

US 2014/0148093 A1    May 29, 2014

(51) Int. Cl.
  *H04B 7/15*     (2006.01)
  *H04B 7/155*    (2006.01)

(52) U.S. Cl.
  CPC .................................. *H04B 7/15507* (2013.01)

(58) Field of Classification Search
  USPC ........................................................ 455/11.1
  See application file for complete search history.

(56) References Cited

U.S. PATENT DOCUMENTS

| | | | |
|---|---|---|---|
| 7,640,028 B2 | 12/2009 | Maheshwari et al. | |
| 8,014,789 B2 | 9/2011 | Breed | |
| 8,035,508 B2 | 10/2011 | Breed | |
| 8,145,199 B2 | 3/2012 | Tadayon et al. | |
| 8,265,001 B2 | 9/2012 | Lee | |
| 2005/0143141 A1 | 6/2005 | Ochi et al. | |
| 2005/0181808 A1 | 8/2005 | Vaudreuil | |
| 2005/0185627 A1 | 8/2005 | Bolgiano et al. | |
| 2006/0160562 A1 | 7/2006 | Davis et al. | |
| 2007/0072616 A1 | 3/2007 | Irani | |
| 2009/0066539 A1 | 3/2009 | Uemura et al. | |
| 2010/0248619 A1* | 9/2010 | Senarath et al. | 455/11.1 |
| 2011/0039581 A1 | 2/2011 | Cai et al. | |
| 2011/0105097 A1 | 5/2011 | Tadayon et al. | |
| 2011/0194407 A1 | 8/2011 | Ji et al. | |

(Continued)

FOREIGN PATENT DOCUMENTS

| | | |
|---|---|---|
| EP | 1003239 A2 | 5/2000 |
| WO | 2011050840 A1 | 5/2011 |
| WO | 2012/135310 | 10/2012 |

OTHER PUBLICATIONS

Mitchell Bingemann, "SIM card dashboard brings broadband to the car," Australian IT, http://www.theaustralian.com.au/, published Feb. 19, 2010, accessed Sep. 17, 2012, 1 page.

(Continued)

*Primary Examiner* — Ankur Jain
(74) *Attorney, Agent, or Firm* — Fish & Richardson P.C.

(57) ABSTRACT

A system and method for communicating with a portable electronic device are provided. The system includes a plurality of relay antennas mounted to a vehicle. The system further includes a processor in communication with the plurality of relay antennas to relay a communication message between the portable electronic device and a base station. The processor is also configured to locate the portable electronic device based on input data received from the plurality of relay antennas. The method involves establishing a communication link between the portable electronic device and a plurality of relay antennas. The method further involves relaying a communication message between the portable electronic device and a base station. The method also involves locating the portable electronic device based on input data from the plurality of relay antennas.

20 Claims, 14 Drawing Sheets

(56) References Cited

U.S. PATENT DOCUMENTS

| | | | |
|---|---|---|---|
| 2011/0195699 A1* | 8/2011 | Tadayon et al. | 455/418 |
| 2011/0219080 A1 | 9/2011 | McWithey et al. | |
| 2011/0237219 A1 | 9/2011 | Mendenhall et al. | |
| 2012/0006610 A1 | 1/2012 | Wallace et al. | |
| 2012/0015625 A1 | 1/2012 | Mendenhall et al. | |
| 2012/0039241 A1 | 2/2012 | Seo | |
| 2012/0040665 A1 | 2/2012 | Liu et al. | |
| 2012/0071151 A1 | 3/2012 | Abramson et al. | |
| 2012/0149341 A1 | 6/2012 | Tadayon et al. | |
| 2012/0161927 A1 | 6/2012 | Pierfelice et al. | |
| 2012/0268235 A1 | 10/2012 | Farhan et al. | |
| 2013/0151088 A1* | 6/2013 | Ricci | 701/51 |

OTHER PUBLICATIONS

Liane Yvkoff, "New tech blocks texting from driver's seat", The Car Tech Blog, CNET Reviews, http://reviews.cnet.com/8301-13746_7-57336421-48/new-tech-blocks-texting-from-drivers-seat/. Published Dec. 5, 2011, accessed Sep. 17, 2012, 4 pages.

J. Yang et al., "Detecting Driver Phone Use Leveraging Car Speakers", Proceeding of MobiCom Sep. 19-23, 2011, Las Vegas, NV, pp. 97-108.

D. Humphrey et al., "Super-Resolution Time of Arrival for Indoor Localization", Proceeding of IEEE International Conference on Communications, 2008, pp. 3286-3290.

H. Liu et al., "Survey of Wireless Indoor Positioning Techniques and Systems", IEEE Transactions on Systems, Man, and Cybernetics, Part C: Applications and Reviews, vol. 37, No. 6, Nov. 2007, pp. 1067-1080.

C. Gentile et al., "An Evaluation of Ultra Wideband Technology for Indoor Ranging", IEEE Global Telecommunications Conference, 2006, pp. 1-6.

C. Gentile et al., "A Comprehensive Evaluation of Indoor Ranging Using Ultra-Wideband Technology", EURASIP Journal of Wireless Communications and Networking, vol. 2007, 12 pages.

3GPP TS 36.355 V10.3.0, "LTE; Evolved Universal Terrestrial Radio Access (E-UTRA); LTE Positioning Protocol (LPP)", Nov. 2011, 117 pages.

3GPP TS 44.031 V10.0.0, "3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP) (Release 10)", Jun. 2010, 148 pages.

3GPP TS 23.271 V10.2.0, "3rd Generation Partnership Project; Technical Specification Group Services and System Aspects;Functional stage 2 description of Location Services (LCS) (Release 10)", Mar. 2011, 169 pages.

Hon Lung Chu, "In-Vehicle Driver Detection Using Mobile Phone Sensors", Submitted Apr. 2011, 21 pages.

Janne Lindqvist et al., "Undistracted Driving: A Mobile Phone that Doesn't Distract", HotMobile'11, Phoenix, Arizona, Mar. 1-2, 2011, 6 pages.

Jeanne Breen Consulting, "Car Telephone Use and Road Safety", Final Report, An overview prepared for the European Commission, Jun. 2009, 21 pages.

Jeffrey (Shih-Kai) Shen, "In-Vehicle Driver Detection Using Mobile Phone Sensors", Jun. 2011, 17 pages.

Marie Stewart, "Sensing Motion in a Mobile Phone and Limiting Functionality of Moving Phones", submitted to Distracted Driving Foundation, Jun. 20, 2010, 5 pages.

Nina Dragutinovic et al., "Use of Mobile Phones While Driving—Effects on Road Safety", SWOV Institute for Road Safety Research, Article No. R-005-12, 2005, Leidschendam, The Netherlands, 57 pages.

Shannon Noder, "Talking and Texting While Driving: A Look at Regulating cell Phone Use Behind the Wheel", 44 Val. U. L. Rev. 237-282, Fall 2009, available at: http://scholar.valpo.edu/vulr/vol44/iss1/7.

World Health Organization, "Mobile Phone Use: A Growing Problem of Driver Distraction", WHO Press, Geneva, Switzerland, 2011, 54 pages.

Yang et al., Detecting Driver Phone Use Leveraging Car Speakers, PowerPoint Presentation, ACM MobiCom 2011, Sep. 2011, 29 pages.

European Patent Office, Extended European Search Report issued in EP Application No. 12194501.8, dated Mar. 1, 2013, 6 pages.

* cited by examiner

SYSTEM AND METHOD FOR COMMUNICATING WITH A PORTABLE ELECTRONIC DEVICE

FIELD

The present specification relates generally to systems for communicating with a portable electronic device, and more particularly to systems for managing features of a portable electronic device.

BACKGROUND

The evolution of portable electronic devices is currently quite active. As portable electronic devices evolve, portable electronic devices now include more functionality than ever before. It is now accepted that the increase in functionality and use of portable electronic devices can cause distraction by attracting attention and focus that should be directed to other tasks resulting in potential dangerous situations. For example, several jurisdictions across North America are now limiting the use of portable electronic devices while performing specific activities such as driving.

BRIEF DESCRIPTION OF THE DRAWINGS

Reference will now be made, by way of example only, to the accompanying drawings in which.

DETAILED DESCRIPTION OF THE EMBODIMENTS

Figure 1:
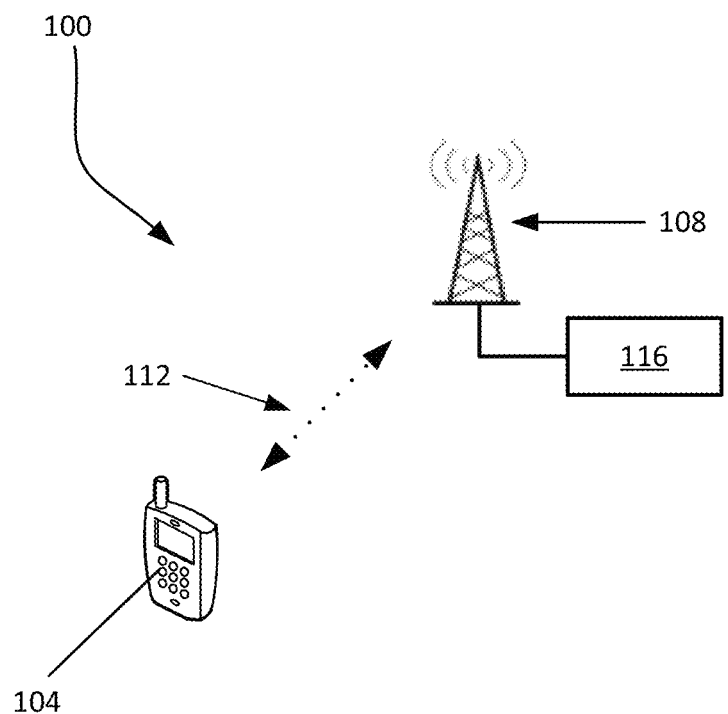
FIG. 1 is a schematic view of a system in accordance with an embodiment.

In accordance with an aspect of the specification, there is provided a system for communicating with a portable electronic device. The system includes a plurality of relay antennas mounted to a vehicle. Each relay antenna of the plurality of relay antennas is configured to communicate with the portable electronic device. The system further includes a processor in communication with the plurality of relay antennas. The processor is configured to relay a communication message between the portable electronic device and a base station. The processor is further configured to locate the portable electronic device based on input data received from the plurality of relay antennas.

The processor may be configured to send a control message to the portable electronic device based on a location of the portable electronic device.

The control message may be for modifying a feature of the portable electronic device.

The system may further include a memory storage unit configured to store the communication message.

The processor may be configured to withhold the communication message associated with the modified feature of the portable electronic device. The processor may be further configured to store the communication message in the memory storage unit.

The system may further include a vehicle interface configured to receive a vehicle message from a vehicle computer.

The vehicle message may provide an indication of a speed of the vehicle.

The processor may be configured to send a control message to the portable electronic device based on a location of the portable electronic device and the speed of the vehicle.

The control message may be for modifying a feature of the portable electronic device.

The system may further include an external antenna in communication with the processor. The external antenna may be configured to communicate with the base station.

In accordance with an aspect of the specification, there is provided a method of communicating with a portable electronic device. The method involves establishing a communication link between the portable electronic device and a plurality of relay antennas. The method further involves relaying a communication message between the portable electronic device and a base station. The method also involves locating the portable electronic device based on input data from the plurality of relay antennas.

The method may further involve executing a control command at the portable electronic device based on a location of the portable electronic device.

Sending the control message may be for modifying a feature of the portable electronic device.

The method may further involve storing the communication message in a memory storage unit.

The method may further involve withholding the communication message associated with the modified feature of the portable electronic device The method may further involve storing the withheld communication message in the memory storage unit.

The method may further involve receiving a vehicle message from a vehicle computer.

The vehicle message may provide an indication of a speed of the vehicle.

The method may further involve sending a control message to the portable electronic device based on a location of the portable electronic device and the speed of the vehicle.

The method may further involve communicating with the base station using an external antenna.

Referring now to FIG. 1, a schematic representation of a non-limiting example of a system 100 for communicating with a portable electronic device is shown. It is to be understood that the system 100 is purely exemplary and it will become apparent to those skilled in the art that a variety of systems are contemplated. The system 100 includes a portable electronic device 104 for sending and receiving data wirelessly, and a base station 108 for communicating with the portable electronic device 104 over a wireless transmission link 112.

In the present embodiment, the base station 108 is part of a wireless network provided by a carrier. The wireless network provides access to other networks, such as the Internet or a telephone network, for the portable electronic device 104. In particular, data is delivered to the portable electronic device 104 via the wireless transmission link 112 from the base station 108. Similarly, data is sent from the portable electronic device 104 via the wireless transmission link 112 to the base station 108. The base station can be connected to a server 116 for managing features of the portable electronic. The manner by which the server 116 manages the portable electronic device 104 is not particularly limited. For example, the server 116 can send command messages to the portable electronic device 104 to enable, modify, or disable features dependent on the location of the portable electronic device 104.

It will be appreciated that the portable electronic device 104 is movable within a coverage area of the base station 108 and can be moved to coverage areas defined by other base stations (not shown). Furthermore, it is to be understood by one of ordinary skill in the art that wireless networks can include LTE, GSM/GPRS, CDPD, TDMA, iDEN Mobitex, DataTAC networks, EDGE or UMTS and broadband networks including variants of IEEE 802.11.

The portable electronic device 104 is generally configured to communicate with the base station 108 via the wireless transmission link 112. In particular, the portable electronic device 104 is configured to receive content from the wireless transmission link 112 and generate associated output at the portable electronic device 104. In addition, the portable electronic device 104 is also configured to receive input and send data associated with the input over the wireless transmission link 112. For example, in the present embodiment, the portable electronic device 104 can receive data representing a voice communication from the wireless transmission link 112 to generate output at a speaker. In turn, the portable electronic device 104 can receive sound input from a microphone and send associated data over the wireless transmission link 112. As another example, the portable electronic device 104 can also be configured to send and receive text messages such as SMS, MMS, email, etc. However, it is to be re-emphasized that the system shown in FIG. 1 is a non-limiting representation only. For example, although only one portable electronic device 104 is shown in FIG. 1, it is to be understood that the system 100 can be modified to include a plurality of portable electronic devices 104, each of the portable electronic devices 104 having its own wireless transmission link 112 to the base station 108 and individually managed by the server 116. Furthermore, it is also to be understood that the portable electronic device 104 can be simultaneously connected to a plurality of base stations 108 if the portable electronic device 104 is within the range of more than one base station. Indeed, a plurality of different configurations of the system 100 is contemplated herein.

Figure 2:
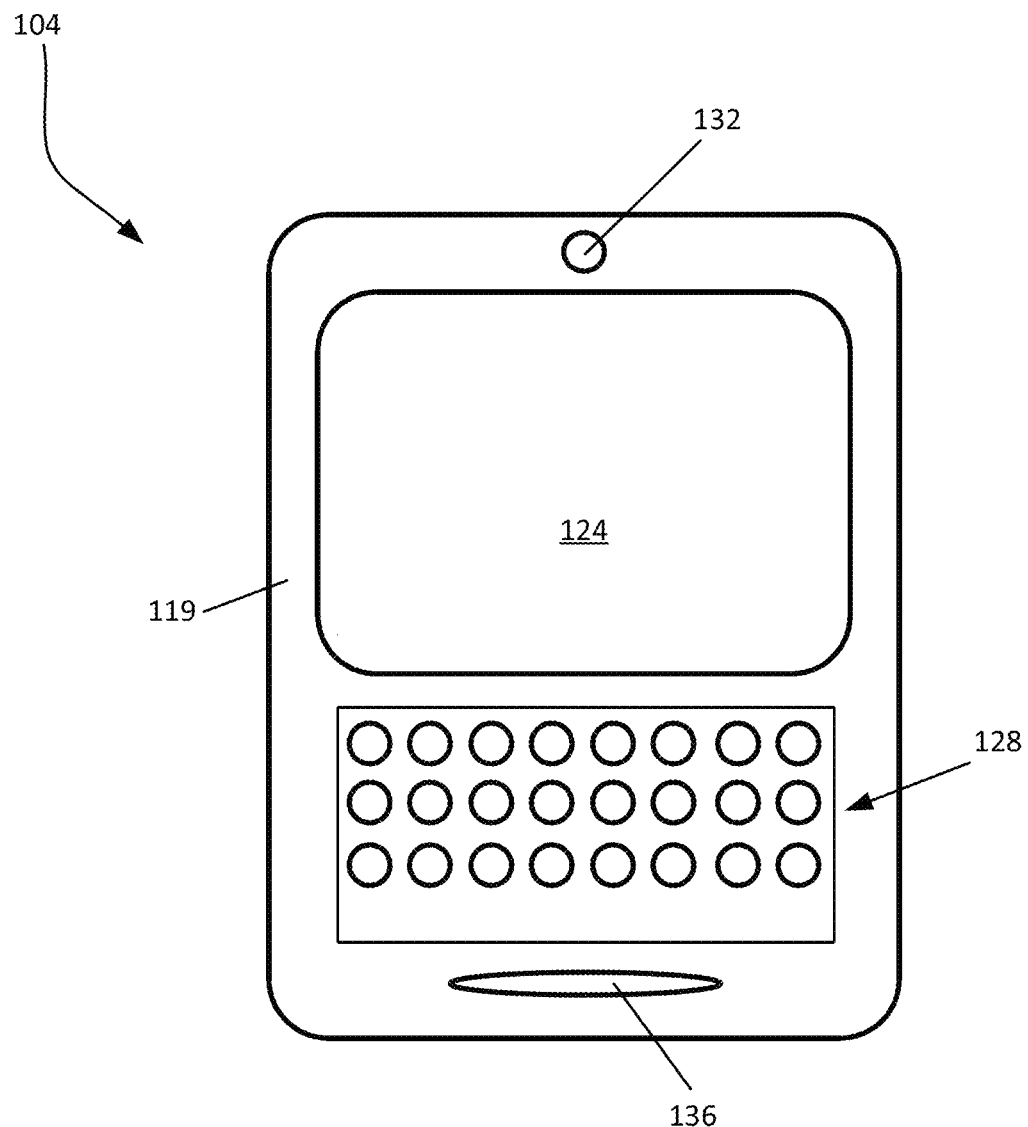
FIG. 2 is a front view of a portable electronic device in accordance with an embodiment.

Referring to FIG. 2, the portable electronic device 104 is shown in greater detail. It is to be understood that the portable electronic device 104 is purely exemplary and it will be apparent to those skilled in the art that a wide variety of portable electronic devices are contemplated. For example, variations on the portable electronic device 104 can include, without limitation, a cellular telephone, a portable email paging device, a camera, a portable music player, a portable video player, a personal digital assistant, a portable book reader, a portable video game player, a tablet computer, a netbook computer, a laptop computer, or an on board computer in a vehicle. Other contemplated variations include devices which are not necessarily portable, such as desktop computers. In the present embodiment, the portable electronic device 104 includes a chassis 119 that supports a display 124, a plurality of keys 128, a speaker 132 and a microphone 136.

The chassis 119 is generally configured to support and protect the remaining components of the portable electronic device 104. In terms of providing physical support, the chassis 119 is typically configured to be mechanically strong enough to provide a rigid or flexible support for the other components of the portable electronic device 104. Furthermore, the chassis 119 is typically constructed such that it is rigid and strong enough to protect the internal components of the portable electronic device 104 from the elements and physical shock. In the present embodiment, it is to be understood that the chassis 119 is generally manufactured from a rigid and strong material such as plastic or metal protect internal components of from traumatic events such as being accidentally dropped. Alternatively, it is also to be understood that in other embodiments, the portable electronic device 104 can be modified to be a flexible device such that the chassis is also flexible.

The display 124 can comprise one or more light emitters such as an array of light emitting diodes (LED), liquid crystals, plasma cells, or organic light emitting diodes (OLED). Other types of light emitters are also contemplated. Furthermore, an optional touch membrane can be overlaid on the display 124 to provide a touchscreen input device.

In the present embodiment, the portable electronic device 104 includes a plurality of keys 128. The arrangement of the plurality of keys 128 is not particularly limited. In some embodiments, the plurality of keys 128 includes keys associated with letters of the alphabet arranged in a QWERTY keyboard layout. In other embodiments, the plurality of keys can be associated with numbers and arranged in a numeric keypad layout. Furthermore, in other embodiments, the portable electronic device 104 can be modified to omit the plurality of keys 128. In portable electronic devices without a plurality of keys, the portable electronic devices are generally configured to include a touchscreen display capable of receiving similar input using a virtual keyboard. Other types of input devices are also contemplated. For example, a touchpad, joystick, trackball, track-wheel, or optical camera or flex sensor or any one or more of them can be provided, in addition to or in lieu of the plurality of keys 128.

The portable electronic device 104 also includes a speaker 132 for generating audio output in the present embodiment. Furthermore, the portable electronic device 104 also includes a microphone 136 for receiving audio input. It is to be appreciated in other embodiments of portable electronic devices, such as those without capabilities for providing voice communication, the speaker and microphone is be optional.

Figure 3:
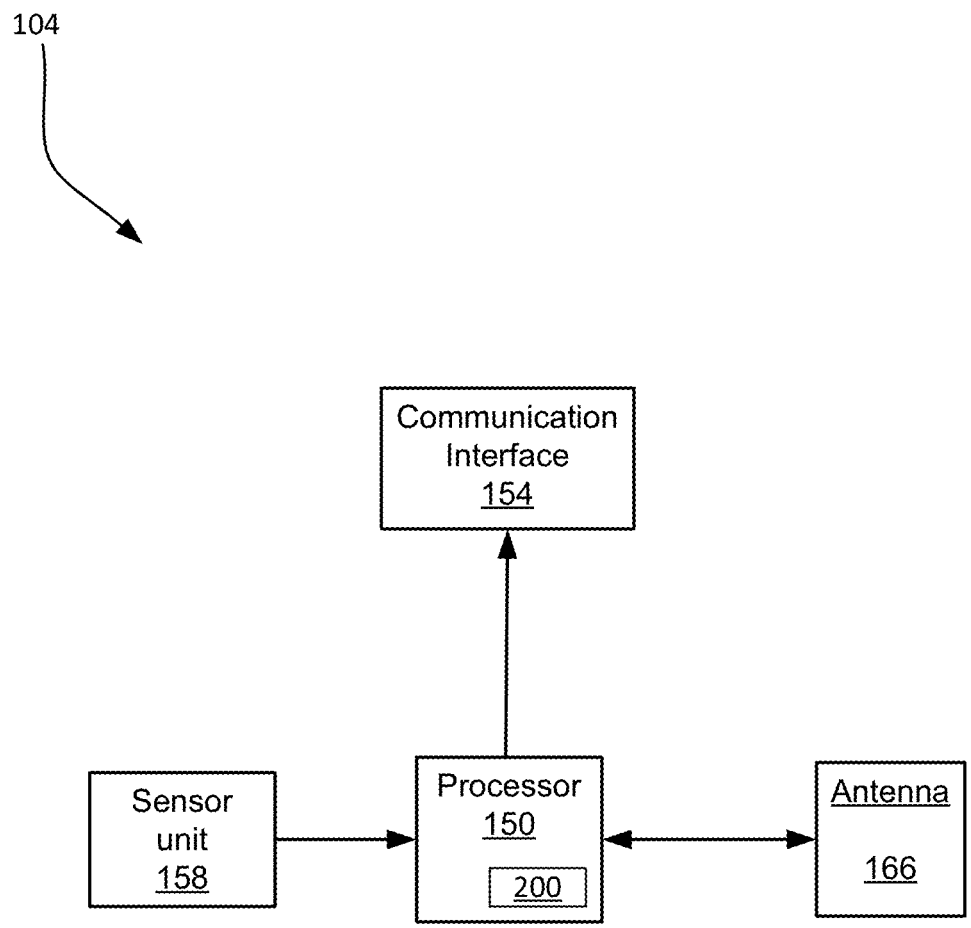
FIG. 3 is a schematic block diagram of the portable electronic device shown in FIG. 2.

Referring to FIG. 3, a schematic Block diagram of the electronic components of the portable electronic device 104 is shown. It should be emphasized that the structure in FIG. 3 is purely exemplary. The portable electronic device 104 includes a processor 150 running programming instructions 200. In general, the programming instructions 200 are stored in a computer readable storage medium accessible by the processor 150. The portable electronic device 104 also includes a communication interface 154, a sensor unit 158, and a device antenna 166.

The processor 150 is generally configured to be in communication with the communication interface 154, the sensor unit 158, and the device antenna 166. The processor 150 is configured to execute programming instructions 200 and to receive data from other components of the portable electronic device 104, which include the communication interface 154 as well as the sensor unit 158. Furthermore, the processor 150 is also configured to send signals via the antenna 166.

The processor 150 is connected to the communication interface 154. The communication interface 154 is generally configured to connect an input or output device associated with the operation the portable electronic device 104. The communication interface 154 is not particularly limited to any specific application. For example, the communication interface 154 can be used to connect the processor 150 with the display 124 for rendering visual output on the display. In addition, communication interface 154 can be used by the processor 150 to receive input data from the plurality of keys 128 or from the microphone 136.

The processor 150 is further connected to the sensor unit 158 generally configured to receive a set data indicative of possible physical states. Therefore, the sensor unit 158 is always in "listening mode" and constantly receiving data from the environment of the portable electronic device 104. Alternatively, in some embodiments, the sensor unit 158 can be modified to receive data during predetermined time periods. Outside of the predetermined time periods, the sensor unit 158 can be de-activated to conserve battery life. It is re-emphasized that the sensor unit 158 is not particularly limited and can include a single sensor or a plurality of sensors in the portable electronic device 104. In addition, the sensor unit 158 can be modified such that it is not dedicated. For example, in some embodiments, the sensor unit 158 can be inactive to conserve power and activated by the processor 150. Furthermore, the sensor unit 158 can include more than one type of sensor. For example, the sensor unit 158 can include at least one of an accelerometer, gyroscope, magnetometer, light sensor, proximity sensor, orientation sensor, altimeter, barometer, thermometer, gravity sensor, touch sensor, stress sensor, pressure sensor, a Hall Effect sensor, radio frequency (RF) power detector, voice detector, digital signal processing monitor, voltage standing wave ratio monitor, device detector, keyboard, touch input device, camera, GPS, and input received from a wireless transmission link.

In the present embodiment, the device antenna 166 is configured as a radio antenna for communicating over the wireless transmission link 112. It will be understood that the device antenna 166 is configured to correspond with the network architecture that defines such the wireless transmission link 112 and that the device antenna 166 is capable of operating at a plurality of different frequencies. Commonly employed network architectures for the wireless transmission link 112 include, but are not limited to, Global System for Mobile communication ("GSM") at approximately one of 850 MHz, 900 MHz, 1800 MHz, or 1900 MHz, General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), LTE (Long Term Evolution), WiMax, ZigBee, Institute of Electrical and Electronic Engineers ("IEEE") standard 802.11, BLUETOOTH or any of their variants or successors.

In general terms, the processor 150 is generally configured to operate the portable electronic device 104 to provide communication. However, it is to be re-emphasized that the structure shown in FIGS. 2 and 3 are schematic, non-limiting representations only. For example, although the portable electronic device 104 shown in FIG. 3 shows the programming instructions being executed by the processor 150, it is to be understood that the portable electronic device 104 can have a plurality of processors, each running programming instructions 200 or portions of programming instructions 200.

Figure 4:
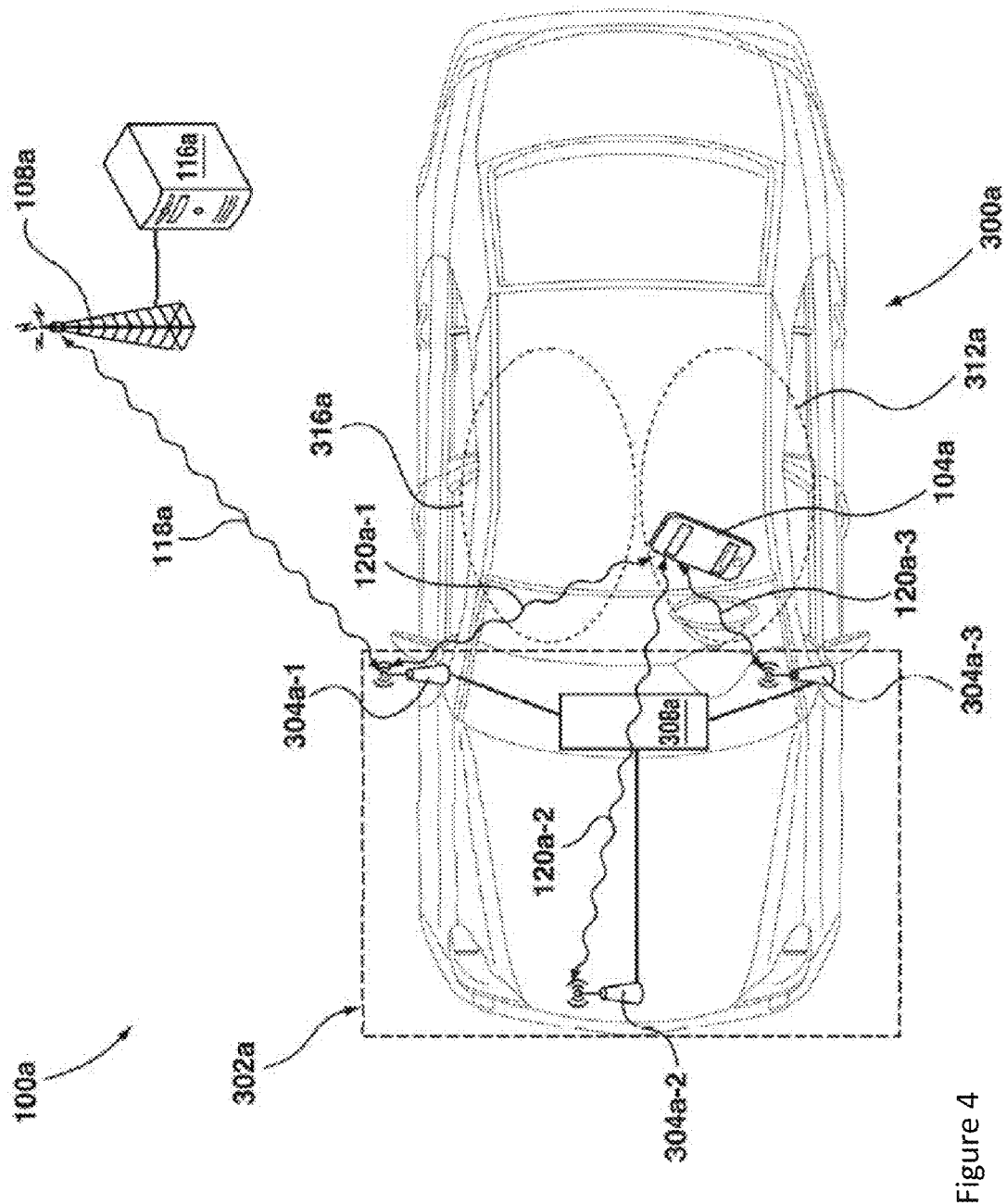
FIG. 4 is a schematic view of a system in accordance with another embodiment.
Figure 5:
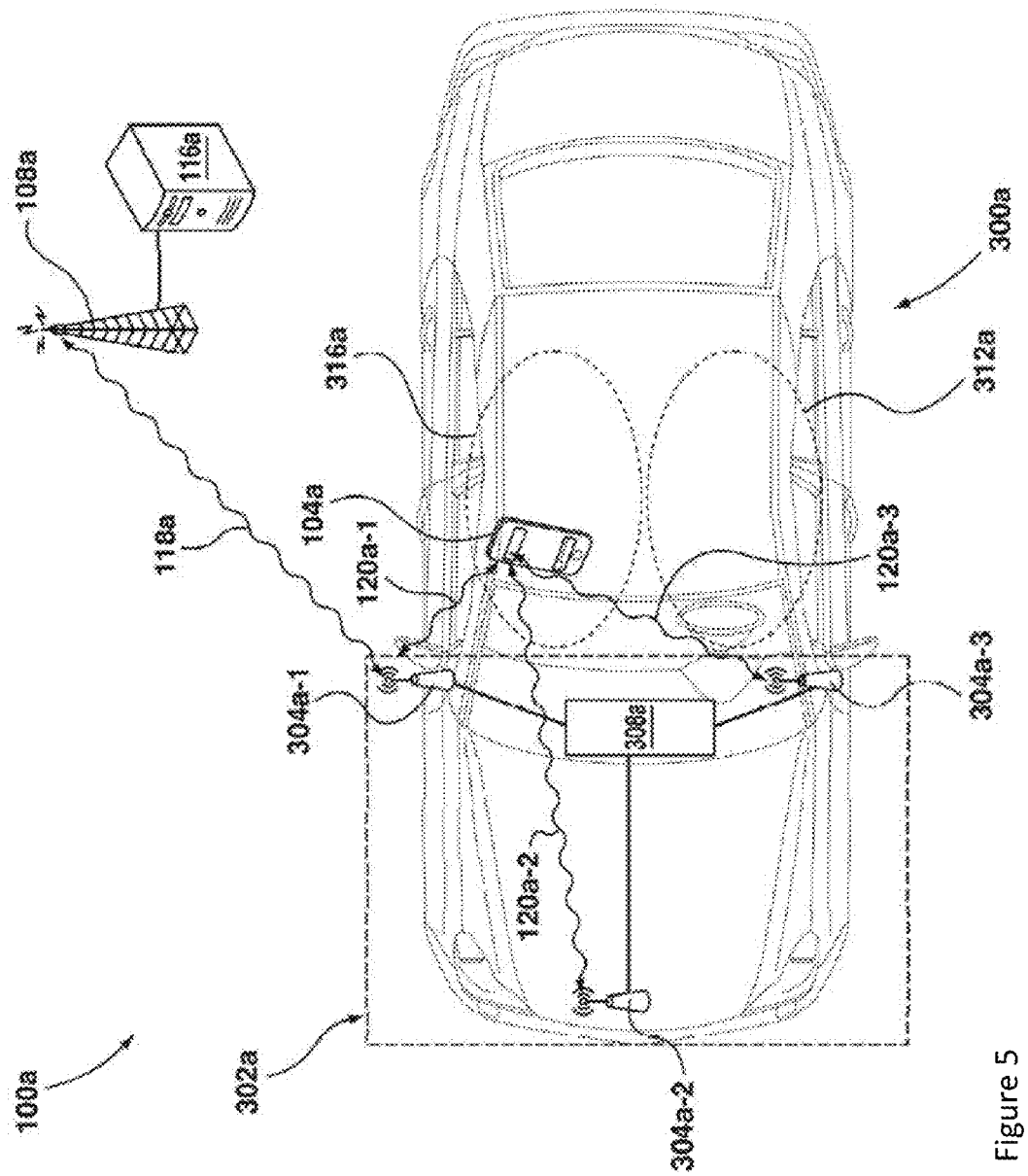
FIG. 5 is a schematic view of the system of FIG. 4 with a different configuration.

Referring now to FIGS. 4 and 5, a schematic representation of another non-limiting example of a system 100a for communicating with a portable electronic device is shown. Like components of the system 100a bear like reference to their counterparts in the system 100, except followed by the suffix "a".

In the present embodiment, the base station 108a is part of a wireless network provided by a carrier. The wireless network provides access to other networks, such as the Internet or a telephone network, ultimately for a portable electronic device 104a. In the present embodiment, data is delivered to the portable electronic device 104a in a vehicle 300a. In FIG. 4, the portable electronic device 104a is located within a driver zone 312a of the vehicle. In FIG. 5, the portable electronic device 104a is located within a passenger zone 316a.

In the present embodiment, the vehicle 300a includes a relay system 302a. The relay system 302a includes central controller 308a in communication with a plurality of relay antennas 304a-1, 304a-2, and 304a-3. The central controller 308a sends and receives messages to the base station 108a using at least one of the plurality of relay antennas 304a-1, 304a-2, and 304a-3 using a wireless transmission link 118a. In the present embodiment, the messages are relayed to the portable electronic device 104a using at least one or more of the plurality of relay antennas 304a-1, 304a-2, and 304a-3 via wireless transmission links 120a-1, 120a-2, and 120a-3, respectively. It is to be appreciated that the same antenna communicating with the base station 108a can be used to relay messages to the portable electronic device 104a. Alternatively, separate antennas of the plurality of relay antennas 304a-1, 304a-2, and 304a-3 can be used to send and to receive messages to the base station 108a and the portable electronic device 104a.

The exact type and the configuration of each relay antenna 304a-1, 304a-2, or 304a-3 is not particularly limited. For example, in the present embodiment, the plurality of relay antennas 304a-1, 304a-2, and 304a-3 are configured to communicate with the portable electronic device 104a using communication standards such as LTE, GSM/GPRS, CDPD, TDMA, iDEN Mobitex, DataTAC networks, EDGE or UMTS. However, in other embodiments the plurality of relay antennas 304a-1, 304a-2, and 304a-3 can be configured to communicate using broadband networks including variants of IEEE 802.11 or BLUETOOTH. It is to be appreciated that by positioning the plurality of relay antennas 304a-1, 304a-2, and 304a-3 closer to the portable electronic device 104a, less power is used to maintain the wireless transmission links 120a-1, 120a-2, and 120a-3 compared with the power used to maintain the wireless transmission link 118a with a base station typically much further from the portable electronic device 104a. Therefore, it is to be understood, with the benefit of the above description, that power consumption at the portable electronic device 104a can be reduced by using the relay system 302a.

In general, the plurality of relay antennas 304a-1, 304a-2, and 304a-3 are mounted to the vehicle 300a. The manner by which the plurality of relay antennas are mounted to the vehicle 300a is not particularly limited and can involve several different mechanisms by which an antenna can be mounted. For example, the plurality of relay antennas 304a-1, 304a-2, and 304a-3 can be mounted to a surface inside the vehicle 300a using adhesive materials. As another example, the plurality of relay antennas 304a-1, 304a-2, and 304a-3 can be mounted on a surface using a fastener such as a screw, nail, clamp or nut and bolt combination. Furthermore, the plurality of relay antennas 304a-1, 304a-2, and 304a-3 can be mounted on the exterior of the vehicle 300a. It is to be appreciated that the mounting mechanism and location of each of the antennas 304a-1, 304a-2, or 304a-3 does not need to be identical and that a wide variety of different mechanisms and locations can be used in combination.

Figure 6:
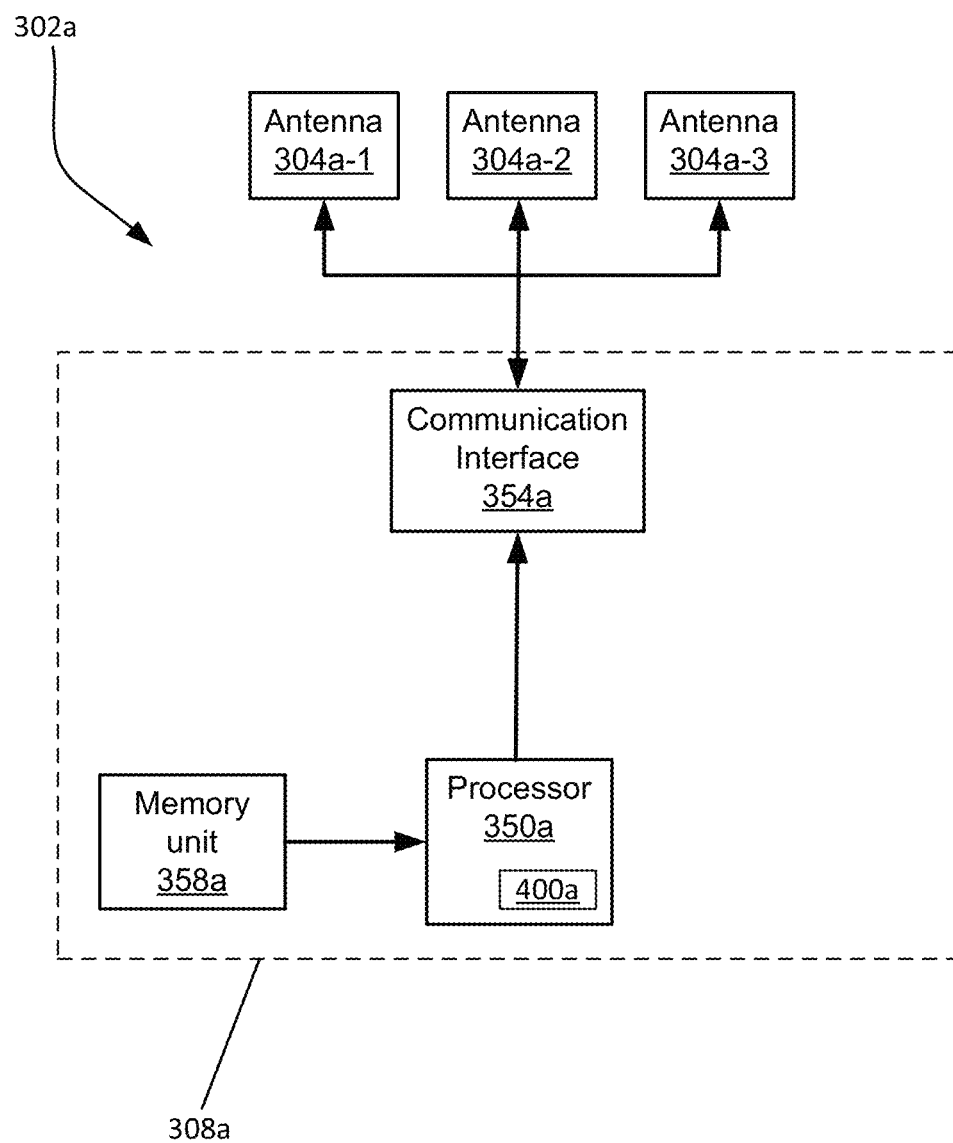
FIG. 6 is a schematic block diagram of the relay system of FIGS. 4 and 5.

Referring to FIG. 6, a schematic Block diagram of the relay system 302a showing the electronic components of the central controller 308a is provided. It should be emphasized that the structure in FIG. 6 is purely exemplary. The central controller 308a includes a processor 350a running programming instructions 400a. In general, the programming instructions 400a are stored in a computer readable storage medium accessible by the processor 350a. In the present embodiment, the central controller 308a also includes a communication interface 354a, and a memory unit 358a.

The processor 350a is generally configured to be in communication with the communication interface 354a and the memory unit 358a. The processor 150 is configured to execute programming instructions 400a and for receiving data from the plurality of relay antennas 304a-1, 304a-2, and 304a-3 via the communication interface 354a.

The communication interface 354a is generally configured to connect an input or output device associated with the operation the central controller 308a. The communication interface 354a is not particularly limited to any specific application. For example, the communication interface 354a can be used to connect the processor 350a with the plurality of relay antennas 304a-1, 304a-2, and 304a-3 as in the present embodiment. In addition, communication interface 354a can be used by the processor 350a to send and receive data, such as messages to a vehicle computer (not shown). The processor 350a can be configured to receive data from the vehicle computer relating to the vehicle such as the vehicle speed. Alternatively, the processor 350a can be configured to send messages to the vehicle computer to control features of the car such as the radio, navigation system, or climate control.

The processor 350a is further connected to the memory unit 358a generally configured to store data. In the present embodiment, the memory unit 358a is configured to store data, such as messages, received from the base station 108a before sending to the portable electronic device 104a. For example, if the portable electronic device 104a is in a state that is unable to receive messages as discussed in greater detail below, the messages can be stored in the memory unit 358a until the portable electronic device 104a can receive messages. As another example, the memory unit 358a can be configured to store data for maintaining a log or transcription of communications between the portable electronic device 104a and the base station 108a.

The programming instructions 400a cause the processor 350a to receive input from the plurality of relay antennas 304a-1, 304a-2, and 304a-3 via the communication interface 354a. The programming instructions 400a direct the processor 350a to analyze the set of data to determine a location of the portable electronic device 104a within the vehicle 300a. For example, the processor 350a can determine whether the portable electronic device 104a is within the driver zone 312a (as shown in FIG. 4) or the passenger zone 316a (as shown in FIG. 5). The programming instructions 400a are not particularly limited to any one method of locating the portable electronic device 104a. For example, the portable electronic device 104a can be located by comparing the time of arrival for a radio signal from the portable electronic device 104a at each of the antennas 304a-1, 304a-2, and 304a-3 to triangulate the location of the portable electronic device 104a. As another example, the intensity of the signals received at each of the antennas 304a-1, 304a-2, and 304a-3 can also be used.

Once the location of the portable electronic device 104a is determined, the programming instructions 400a can proceed to direct the processor 350a to send a control message to the portable electronic device 104a for controlling the portable electronic device 104a. In the present embodiment, the control message is configured to disable or to modify a feature of the portable electronic device 104a when the portable electronic device is determined to be in the driver zone 312a. For example, if the portable electronic device 104a is a mobile phone, the control message can be used to disable SMS text messaging capabilities of the mobile phone. It is to be appreciated that the control message is not particularly limited and that in other embodiments, the control message can be configured to enable certain features of the portable electronic device 104a or the control message can be omitted completely for embodiments where only the location of the portable electronic device 104a is desired.

In general terms, the central controller 308a is generally configured to relay a message from the base station 108a to the portable electronic device 104a to reduce power consumption at the portable electronic device 104a. In addition, the central controller 308a is configured to locate the portable electronic device 104a within the vehicle 300a based on input data received from the plurality of relay antennas 304a-1, 304a-2, and 304a-3. It is to be appreciated that in some embodiments, the location of the portable electronic device 104a as determined by the central controller 308a can be provided upon an external request or uploaded to the server 116a for publication.

It is to be re-emphasized that the structure shown in FIG. 6 is a schematic, non-limiting representation only. For example, although the central controller 308a shown in FIG. 6 shows the programming instructions 400a being executed by the processor 350a, it is to be understood that the central controller 308a can have a plurality of processors, each running programming instructions 400a or portions of programming instructions 400a. Furthermore, it is also to be appreciated that in some embodiments where messages are not withheld from the portable electronic device 104a, the memory unit 358a can be omitted from the central controller 308a.

Furthermore, the system 100a is generally configured for communicating with a portable electronic device 104a. It is to be re-emphasized that the structure shown in FIGS. 4 to 6 is a non-limiting representation only. Notwithstanding the specific example, it is to be understood that other equivalent structures involving equivalent components can be devised to perform the same function as the system 100a. For example, the vehicle 300a is not particularly limited to any type of vehicle. In the present embodiment, the vehicle 300a is shown to be an automobile with a driver zone 312a and a passenger zone 316a. In other embodiments, the number of zones can be greater than two such that different control messages are generated for each zone. Furthermore, the vehicle 300a is not limited to an automobile and can be modified to be a truck, bus, train, aircraft, boat, ship or any other machine used to transport passengers or cargo.

Figure 7:
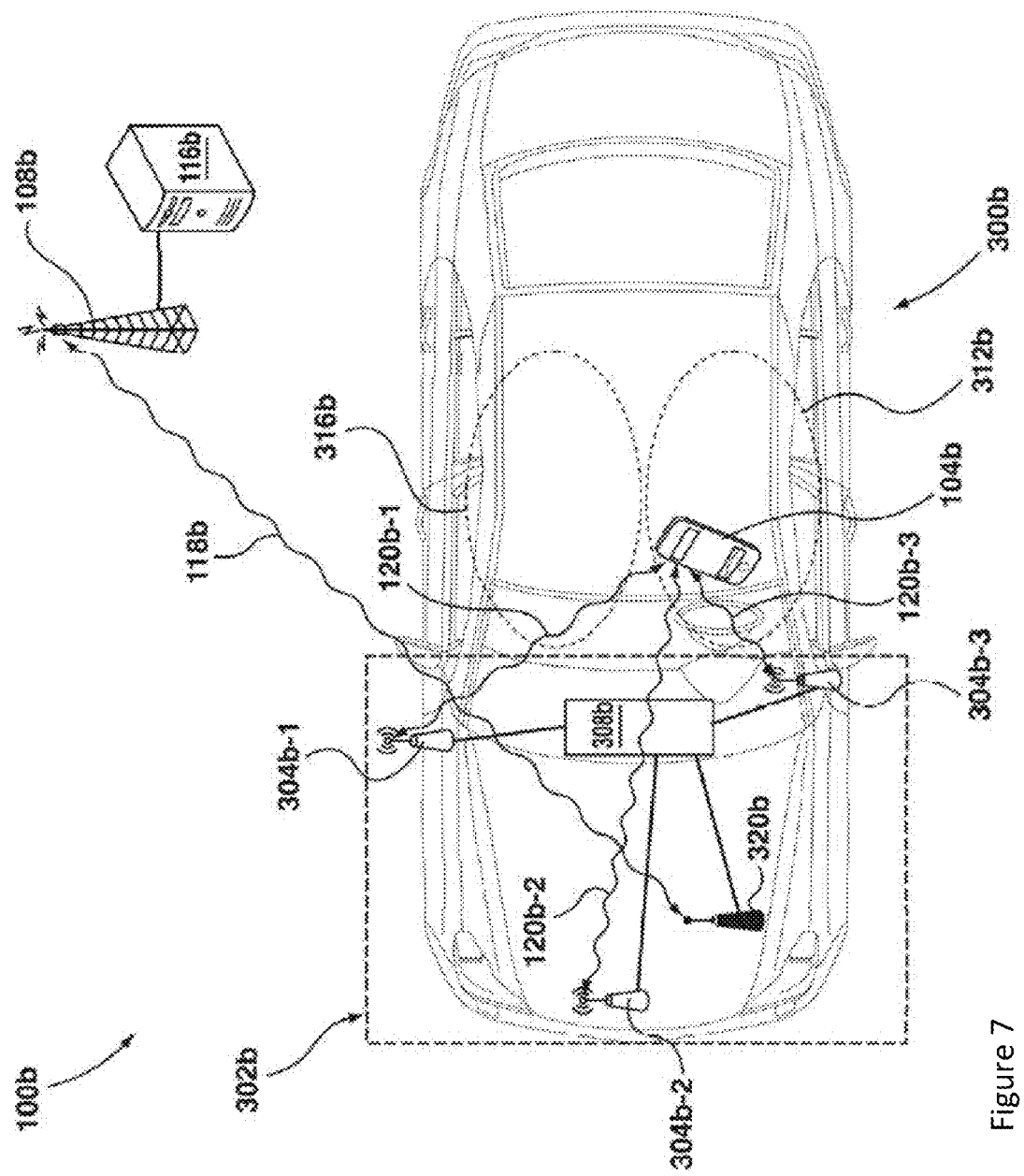
FIG. 7 is a schematic view of a system in accordance with another embodiment.

Referring to FIG. 7, a schematic representation of another non-limiting example of a system 100b for communicating with a portable electronic device is shown. Like components of the system 100b bear like reference to their counterparts in the system 100a, except followed by the suffix "b" instead of "a". The system 100b includes a base station 108b, a server 116b in communication with vehicle 300b via a transmission link 118b between the base station 108b and a relay system 302b. The relay system 302b includes a plurality of relay antennas 304b-1, 304b-2, and 304b-3 communicating with the portable electronic device 104b via transmission links 120a-1, 120a-2, and 120a-3, respectively. The vehicle 300b also includes a driver zone 312b and a passenger zone 316b.

In the present embodiment, the vehicle 300b includes a relay system 302a having an external antenna 320b configured to communicate with the base station 108b. The external antenna 320b is in communication with the central controller 308b similar to the plurality of relay antennas 304b-1, 304b-2, and 304b-3. In the present embodiment, the external antenna 320b is modified from the plurality of relay antennas 304b-1, 304b-2, and 304b-3 to accommodate for differences between communicating with the base station 108b and the portable electronic device 104b. For example, since the base station 108b is generally at a much greater distance from the external antenna 320b than the portable electronic device is from any one of the plurality of relay antennas 304b-1, 304b-2, and 304b-3, the external antenna is capable of handling more power. Therefore, in the present embodiment, the plurality of relay antennas 304b-1, 304b-2, and 304b-3 can be configured to be exclusively used for communicating with the portable electronic device 104b. Furthermore, it is to be appreciated that the vehicle 300b can be modified to include more than one external antenna 320b. By installing more external antennas on the vehicle 300b, the central controller 308b can communicate better with the base station 108b.

Figure 8:
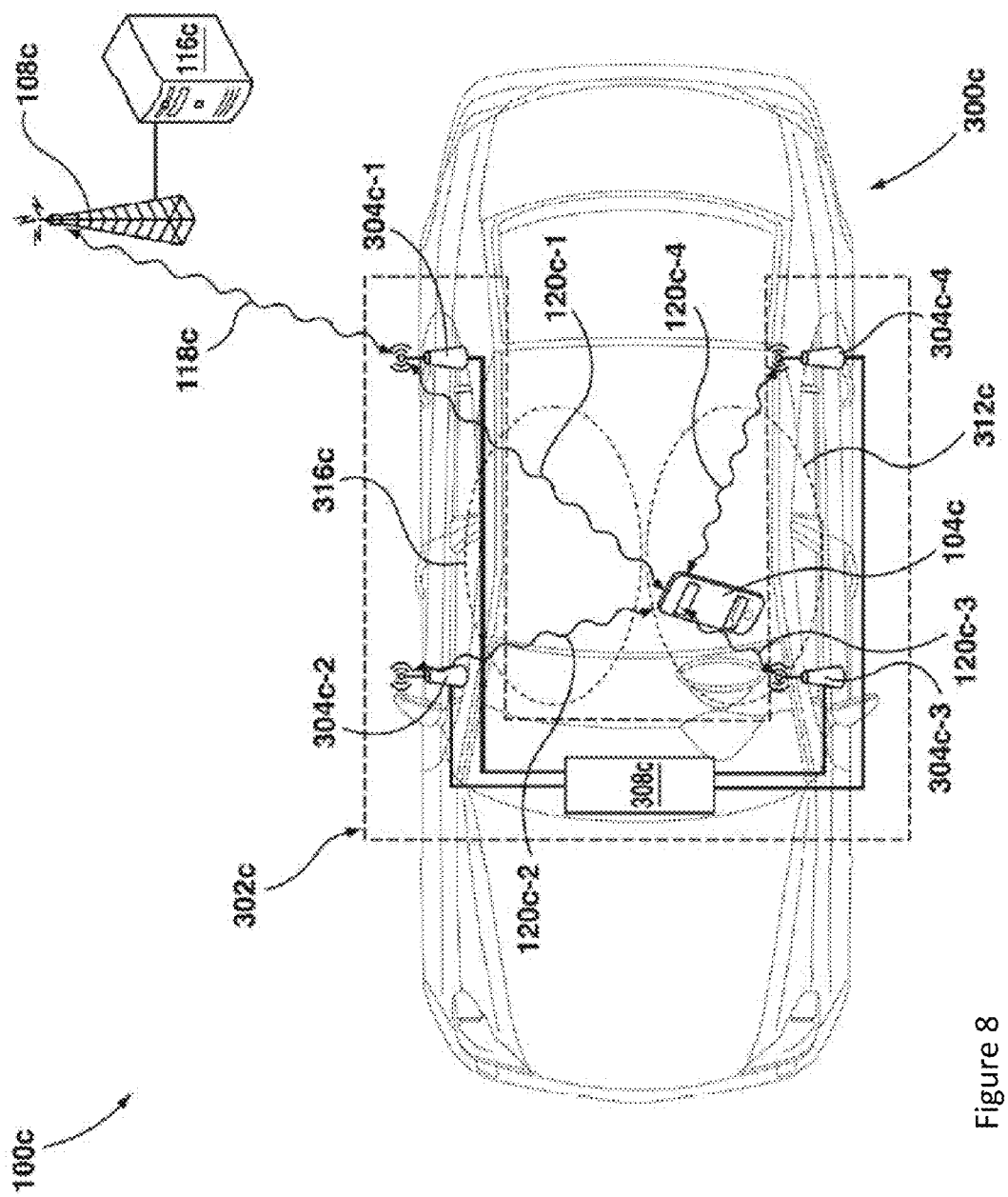
FIG. 8 is a schematic view of a system in accordance with another embodiment.

Referring to FIG. 8, a schematic representation of another non-limiting example of a system 100c for communicating with a portable electronic device is shown. Like components of the system 100c bear like reference to their counterparts in the system 100a, except followed by the suffix "c" instead of "a". The system 100c includes a base station 108c, a server 116c in communication with vehicle 300c via a transmission link 118c between the base station 108c and a relay system 302c. The relay system 302c includes a plurality of relay antennas 304c-1, 304c-2, 304c-3, and 304c-4 communicating with the portable electronic device 104c via transmission links 120c-1, 120c-2, 120c-3, and 120c-4, respectively. The vehicle 300c also includes a driver zone 312c and a passenger zone 316c.

In the present embodiment, the vehicle 300c includes the fourth relay antenna 304c-4. It is to be appreciated that the system 100c functions in a similar manner as the system 100a. The addition of the extra relay antenna 304c-4 to the vehicle 300c provides increased precision to the localization of the portable electronic device 104c. It is to be appreciated that the number of relay antennas is therefore not limited to three or four, but can include a large number of antennas. However, mounting more antennas in the vehicle 300c uses more physical space within the vehicle 300c to which the antennas need to be mounted. Alternatively, it is also to be appreciated that the number of antennas can be fewer than three where the precise location of the portable electronic device is not required. For example, two antennas can be used to determine if the portable electronic device 104c is on the left side or the right side of the vehicle 300c. As another example, a single antenna can be used to determine whether the portable electronic device 104c is beyond a predetermined threshold distance from the single antenna to define two zones or more zones.

Figure 9:
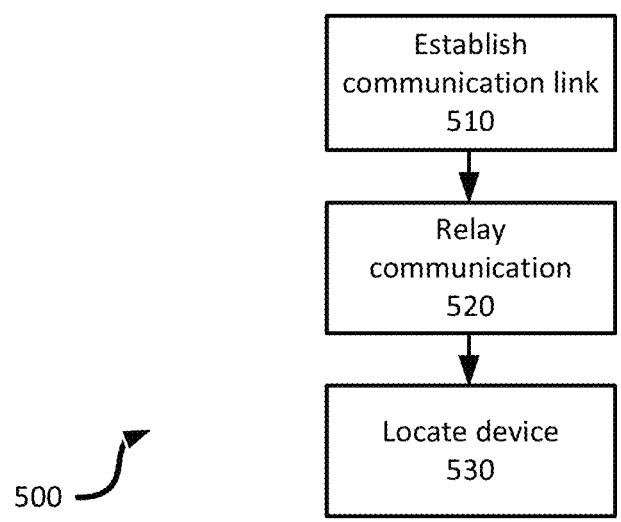
FIG. 9 is a flow chart of a method in accordance with an embodiment.

Referring now to FIG. 9, a method for communicating with a portable electronic device 104a is represented in the form of a flowchart and indicated generally at 500. In the present embodiment, the method 500 can be implemented using the system 100a. However, it is to be understood that the method 500 is not limited to the system 100a and can be implemented on a wide variety of systems, such as the system 100b and the system 100c. Furthermore, the following discussion of the method 500 will lead to further understanding of the system 100a and its various components. Although some blocks of the method 500 are indicated as occurring within certain components of the system 100a, it is to be understood that the system 100a or the method 500 can be varied, and need not work as discussed herein in conjunction with each other. In addition, it is to be appreciated that the method 500 need not be performed in the exact sequence as shown, hence the elements of the method are referred to herein as "blocks" rather than "steps". For example, a person skilled in the art will appreciate with the benefit of these teachings that the order of some blocks can be interchanged and that some blocks can also be performed in parallel.

Beginning at Block 510, the central controller 308a establishes a communication link via the plurality of relay antennas 304a-1, 304a-2, and 304a-3 with the portable electronic device 104a. In the present embodiment, the communication link includes the wireless transmission links 120a-1, 120a-2, and 120a-3 established between each of the plurality of relay antennas 304a-1, 304a-2, and 304a-3 to the portable electronic device 104a, respectively. However, it is to be appreciated that not all three wireless transmission links 120a-1, 120a-2, and 120a-3 need to be established. For example, only two of the three wireless transmission links 120a-1, 120a-2, and 120a-3 can be used to establish the communication link between the portable electronic device and the plurality of relay antennas 304a-1, 304a-2, and 304a-3 such that one of the antennas are not in use.

Block 520 comprises relaying a communications message between the portable electronic device 104a and the base station 108a. The manner in which the communication message are relayed is not particularly limited and can involve various methods of communications using various communication standards. In the present embodiment, the central controller 308a can be configured to simply route the communication message between the portable electronic device 104a and the base station 108a while merely acting as an amplifier for amplifying a signal from the portable electronic device 104a and for transmission to the base station 108a. It is to be appreciated that due to the proximity of the portable electronic device 104a to the plurality of relay antennas 304a-1, 304a-2, and 304a-3, a relatively weaker signal can be generated by the portable electronic device 104a to transmit the communication message to the central controller 308a. Therefore, the portable electronic device 104a uses less power to send the communication message than if the portable electronic device 104a were to communicate directly with the base station 108a. Since the central controller 308a is powered with a power supply of the vehicle 300a, power optimization is less of a concern.

It is to be re-emphasized that the relaying operation is not particularly limited and that other methods of relaying a communication method are contemplated. For example, in other embodiments, relaying the communications message can involve the central controller 308a processing the communication message between the base station 108a and the portable electronic device 104a. For example, sending and receiving the communication message between the central controller 308a and the base station 108a can involve using a first standard suitable for long range communication, such as LTE, GSM/GPRS, CDPD, TDMA, iDEN Mobitex, DataTAC networks, EDGE or UMTS. In contrast, sending and receiving the communication message between the central controller 308a and the portable electronic device 104a can involve using a second standard suitable for short range communication, such as BLUETOOTH or WIFI. Furthermore, it is to be appreciated, with the benefit of this specification, that more than one communication message can be relayed and the communication messages can be relayed simultaneously or sequentially.

Block 530 comprises locating the portable electronic device 104*a* based on input data received from the plurality of relay antennas 304*a*-1, 304*a*-2, and 304*a*-3. The input data is not particularly limited and can include a variety of different types. In the present embodiment, the input data includes the communication messages generated by the portable electronic device 104*a*. In other embodiments, the input data can include a signal sent from the portable electronic device 104*a* in response to a request from the central controller 308*a*.

The portable electronic device 104*a* can be located using various methods that are not particularly limited. In the present embodiment, electromagnetic signals are used to transmit the messages between the central controller 308*a* and the portable electronic device 104*a*. Therefore, several characteristics of the signals receive at the plurality of relay antennas 304*a*-1, 304*a*-2, and 304*a*-3 can be used to locate the portable electronic device such as propagation time, timing advance, time difference of arrival, reference signal time difference, and angle of arrival, received signal strength. For example, the central controller 308*a* can use an observed time difference of arrival method, where the central controller 308*a* measures reference signal time difference on different signals received from multiple antennas of the vehicle. The location of the portable electronic device 104*a* can then be calculated by using a multilateration technique.

It is to be re-emphasized that the locating operation is not particularly limited and that variations are contemplated. For example, although the localization is described above to be carried out on the central controller 308*a*, the portable electronic device 104*a* can carry out similar methods to locate its position by interacting with the plurality of relay antennas 304*a*-1, 304*a*-2, and 304*a*-3, for example, when the relative positions of the plurality of relay antennas 304*a*-1, 304*a*-2, and 304*a*-3 is known to the portable electronic device 104*a*.

In another embodiment, the locating operation can be carried out by a combination of the central controller 308*a* and the portable electronic device 104*a*. For example, input data can be received by the central controller 308*a* from the plurality of relay antennas 304*a*-1, 304*a*-2, and 304*a*-3. The input data can be transmitted to the portable electronic device 104*a*, which carries out one of the locating methods described above based on the input data received from the central controller 308*a*. Alternatively, the input data can be collected by the portable electronic device 104*a* interacting with known relative positions of the plurality of relay antennas 304*a*-1, 304*a*-2, and 304*a*-3. The input data collected by the portable electronic device 104*a* can be transmitted to the central controller 308*a*, which carries out one of the locating methods described above based on the input data received from the portable electronic device 104*a*. It is to be appreciated that the use of either the central controller 308*a* or the portable electronic device 104*a* for carrying out the locating operation based on the input data can be determined based on the relative available processing capabilities of the central controller 308*a* or the portable electronic device 104*a*.

In further embodiments, the input data can be collected by both the portable electronic device 104*a* and the central controller 308*a* for processing at one or both of the portable electronic device 104*a* and the central controller 308*a*. It is to be appreciated, with the benefit of this description, that by using input data from both the portable electronic device 104*a* and the central controller 308*a*, the precision to which the locating operation can determine the position of the portable electronic device 104*a* can be increased. Furthermore, in embodiments where both the central controller 308*a* and the portable electronic device 104*a* determine a location, the location determined by each of the central controller 308*a* and the portable electronic device 104*a* can be compared to verify the location as part of an error detection operation.

Figure 10:
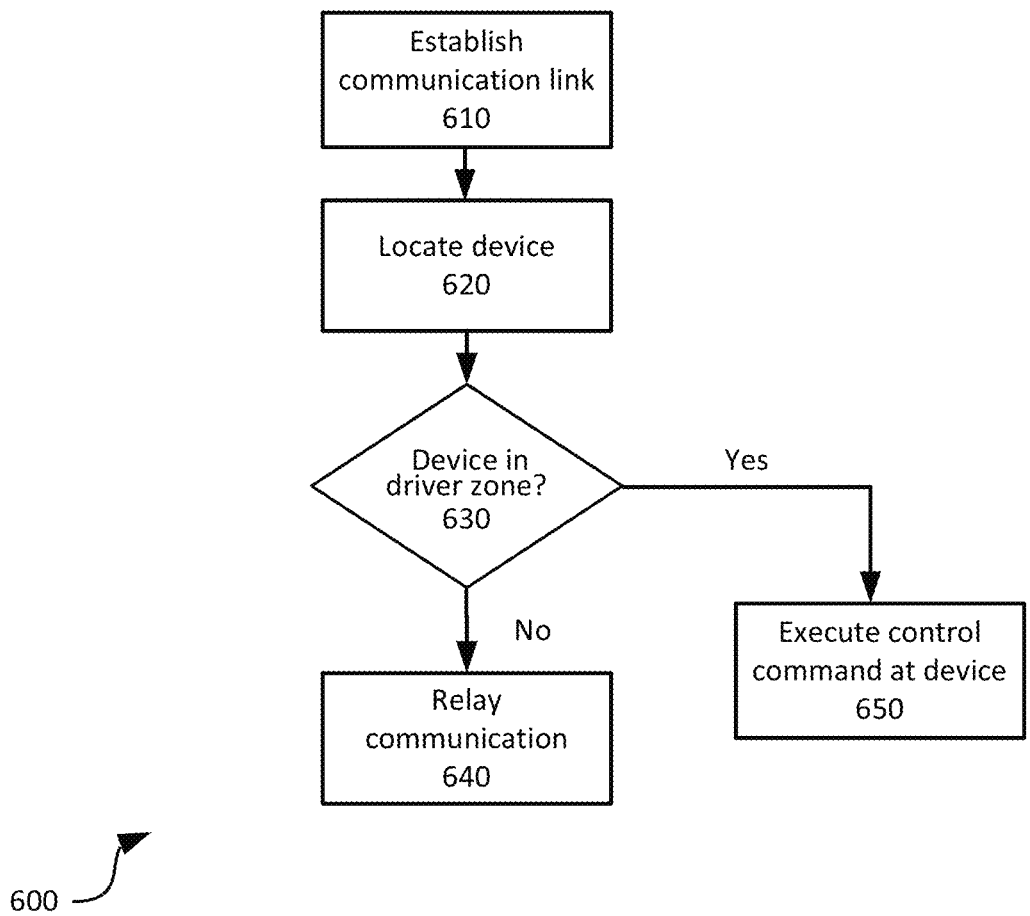
FIG. 10 is a flow chart of a method in accordance with another embodiment.

Referring now to FIG. 10, another method or communicating with a portable electronic device 104*a* is represented in the form of a flowchart and indicated generally at 600. In the present embodiment, the method 600 can be implemented using the system 100*a*. However, it is to be understood that the method 600 is not limited to the system 100*a* and can be implemented on a wide variety of systems, such as the system 100*b* and the system 100*c*. Furthermore, the following discussion of the method 600 will lead to further understanding of the system 100*a* and its various components as well as understanding other uses for the system 100*a*. Although some blocks of the method 600 are indicated as occurring within certain components of the system 100*a*, it is to be understood that the system 100*a* or the method 600 can be varied, and need not work as discussed herein in conjunction with each other. In addition, it is to be appreciated that the method 600 need not be performed in the exact sequence as shown, hence the elements of the method are referred to herein as "blocks" rather than "steps". For example, a person skilled in the art will appreciate with the benefit of these teachings that the order of some blocks can be interchanged and that some blocks can also be performed in parallel.

Beginning at Block 610, the central controller 308*a* establishes a communication link via the plurality of relay antennas 304*a*-1, 304*a*-2, and 304*a*-3 with the portable electronic device 104*a*. The manner in which the Block 610 establishes a communication link is not particularly limited and can include the manners discussed in connection with Block 510.

Block 620 comprises locating the portable electronic device 104*a* based on input data received from the plurality of relay antennas 304*a*-1, 304*a*-2, and 304*a*-3. The manner by which the Block 620 locates the portable electronic device is not particularly limited and can include the manners discussed above in connection with Block 530.

Block 630 comprises determining whether the portable electronic device 104*a* is located within the driver zone 312*a*. The manner by which the determination can be made is not particularly limited. In the present embodiment, the central controller 308*a* stores a table of predefined locations which are within the driver zone 312*a*. The location obtained from the execution of Block 620 is used as the location of the portable electronic device 104*a*. The central controller 308*a* uses the location and compares it with the table of predefined locations which are within the driver zone 312*a*. If the location does not match any location in the table, the execution of Block 630 results in "no" and lead to Block 640. Alternatively, if the location matches a location in the table, the execution of Block 630 results in "yes" and lead to Block 650.

It is to be re-emphasized that the determination operation described in Block 630 is not particularly limited and that several variations are contemplated. For example, instead of using a table of discrete locations, the central controller 308*a* can store ranges of coordinates which define the borders of the driver zone 312*a*. As another variant, Block 630 can be carried out at the portable electronic device 104*a* instead of at the central controller 308*a* using results of Block 620 carried out by the central controller 308*a*. The location can subsequently be sent to the portable electronic device 104*a* where the determination operation can be carried out. Alternatively, the portable electronic device 104*a* can carry out Block 620 while the central controller 308*a* carries out Block 630.

Block 640 comprises relaying communications messages between the portable electronic device 104a and the base station 108a. The manner by which the Block 640 relays communications messages is not particularly limited and can include the manners discussed above in connection with Block 520.

Block 650 comprises executing a control command at the portable electronic device 104a. In the present embodiment, the control command is generated at the central controller 308a and transmitted to the portable electronic device 104a as a control message. The control command is not particularly limited. In the present embodiment, the control command is configured to cause the portable electronic device 104a to enable, modify, or disable specific features. For example, if the portable electronic device 104a is in the driver zone 312a, features such as phone calls, emails, instant messaging, video players, GPS navigation, and other programs capable of running on the portable electronic device 104a can be modified or disabled if the portable electronic device 104a is within the driver zone 312a to reduce distraction.

It is to be emphasized that Block 650 described above is not particularly limited and that several variations are contemplated. In other embodiments, the control message can be omitted if the determination made at Block 630 was carried out at the portable electronic device 104a. Furthermore, although the above example describes executing a control command on the portable electronic device 104a when the portable electronic device 104a is in the driver zone 312a, a control command can be executed when the portable electronic device 104a is in the passenger zone 316a or any other zone of the vehicle 300a.

In other embodiments, the control message can also be generated at the base station 108a and relayed to the portable electronic device 104a via the central controller 308a. In such embodiments, the central controller 308a relays the location of the portable electronic device 104a from the execution of Block 620 to the server 116a connected to the base station 108a which returns the control message in response. It is to be appreciated that such embodiments provide a centralized location from which to send the control messages where policy changes regarding the control messages can be easily made.

Figure 11:
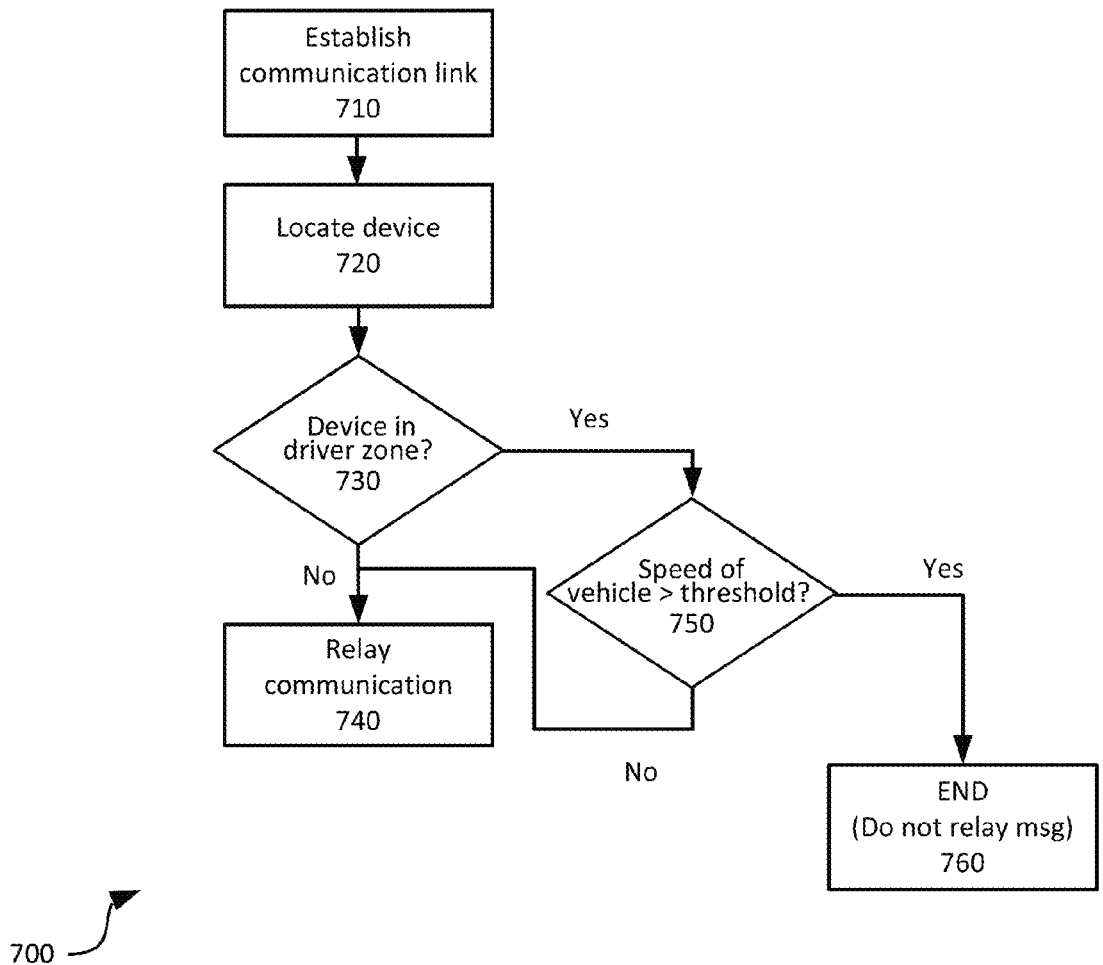
FIG. 11 is a flow chart of a method in accordance with another embodiment.

Referring now to FIG. 11, another method or communicating with a portable electronic device 104a is represented in the form of a flowchart and indicated generally at 700. In the present embodiment, the method 700 can be implemented using the system 100a. However, it is to be understood that the method 700 is not limited to the system 100a and can be implemented on a wide variety of systems, such as the system 100b and the system 100c. Furthermore, the following discussion of the method 700 will lead to further understanding of the system 100a and its various components as well as understanding other uses for the system 100a. Although some blocks of the method 700 are indicated as occurring within certain components of the system 100a, it is to be understood that the system 100a or the method 700 can be varied, and need not work as discussed herein in conjunction with each other. In addition, it is to be appreciated that the method 700 need not be performed in the exact sequence as shown, hence the elements of the method are referred to herein as "blocks" rather than "steps". For example, a person skilled in the art will appreciate with the benefit of these teachings that the order of some blocks can be interchanged and that some blocks can also be performed in parallel.

Beginning at Block 710, the central controller 308a establishes a communication link via the plurality of relay antennas 304a-1, 304a-2, and 304a-3 with the portable electronic device 104a. The manner in which the Block 710 establishes a communication link is not particularly limited and can include the manners discussed in connection with Block 510.

Block 720 comprises locating the portable electronic device 104a based on input data received from the plurality of relay antennas 304a-1, 304a-2, and 304a-3. The manner by which the Block 720 locates the portable electronic device is not particularly limited and can include the manners discussed above in connection with Block 530.

Block 730 comprises determining whether the portable electronic device 104a is located within the driver zone 312a. The manner by which the Block 730 makes the determination is not particularly limited and can include the manners discussed above in connection with Block 630. If the portable electronic device 104a is not in the driver zone 312a, the method 700 leads to Block 740. Alternatively, if the portable electronic device 104a is in the driver zone 312a, the method 700 leads to Block 750.

Block 740 comprises relaying communications messages between the portable electronic device 104a and the base station 108a. The manner by which the Block 740 relays communications messages is not particularly limited and can include the manners discussed above in connection with Block 520.

Block 750 comprises determining whether the vehicle 300a is travelling above a predefined threshold speed. The manner by which the determination can be made is not particularly limited. In the present embodiment, the central controller 308a receives vehicle messages from a vehicle computer which includes an indication of the speed at which the vehicle 300a is travelling. In other embodiments, the portable electronic device 104a can include a GPS system or a speed sensor which can determine the speed at which the portable electronic device 104a, and thus the vehicle 300a, is travelling. If the speed is below the predefined threshold value, the execution of Block 750 results in "no", and lead to Block 740. Alternatively, if the speed is above the predefined threshold value, the execution of Block 750 results in "yes", and lead to Block 760.

Block 760 is the end of method 700. It is to be appreciated that the message is never relayed to the portable electronic device 104a in this embodiment. Therefore, the portable electronic device 104a is effectively disabled such that the portable electronic device 104a can no longer communicate with the base station 108a via the relay system 302a. In the present embodiment, messages received by the central controller 308a are stored in the memory unit 358a and withheld from the portable electronic device 104a until the method 700 permits the central controller 308a to relay messages to the portable electronic device 104a. However, in other embodiments, the messages can simply never be delivered or returned to a portable electronic device of the sender with notification of a failed delivery.

It is to be understood that many combinations, variations and subsets of the embodiments and teachings herein are contemplated. As a non-limiting example, it is to be appreciated that Block 650 of method 600 can be interchanged with clock 760 of the method 700. Both blocks 650 and 760 effectively disable the portable electronic device 104a in conditions where the portable electronic device 104a should not be used as inferred by the location of the portable electronic device. As a non-limiting example of a variation, the execution of Block 650 or 760 can also include automatically returning a message to a second portable electronic device of a sender trying to contact the portable electronic device 104a to alert the second portable electronic device that the portable electronic device 104a is unavailable for a communication session. As a non-limiting example of a variation, a warning message indicating that the delivery of the communication message will be delayed can be sent to the portable electronic device of the sender.

Figure 12:
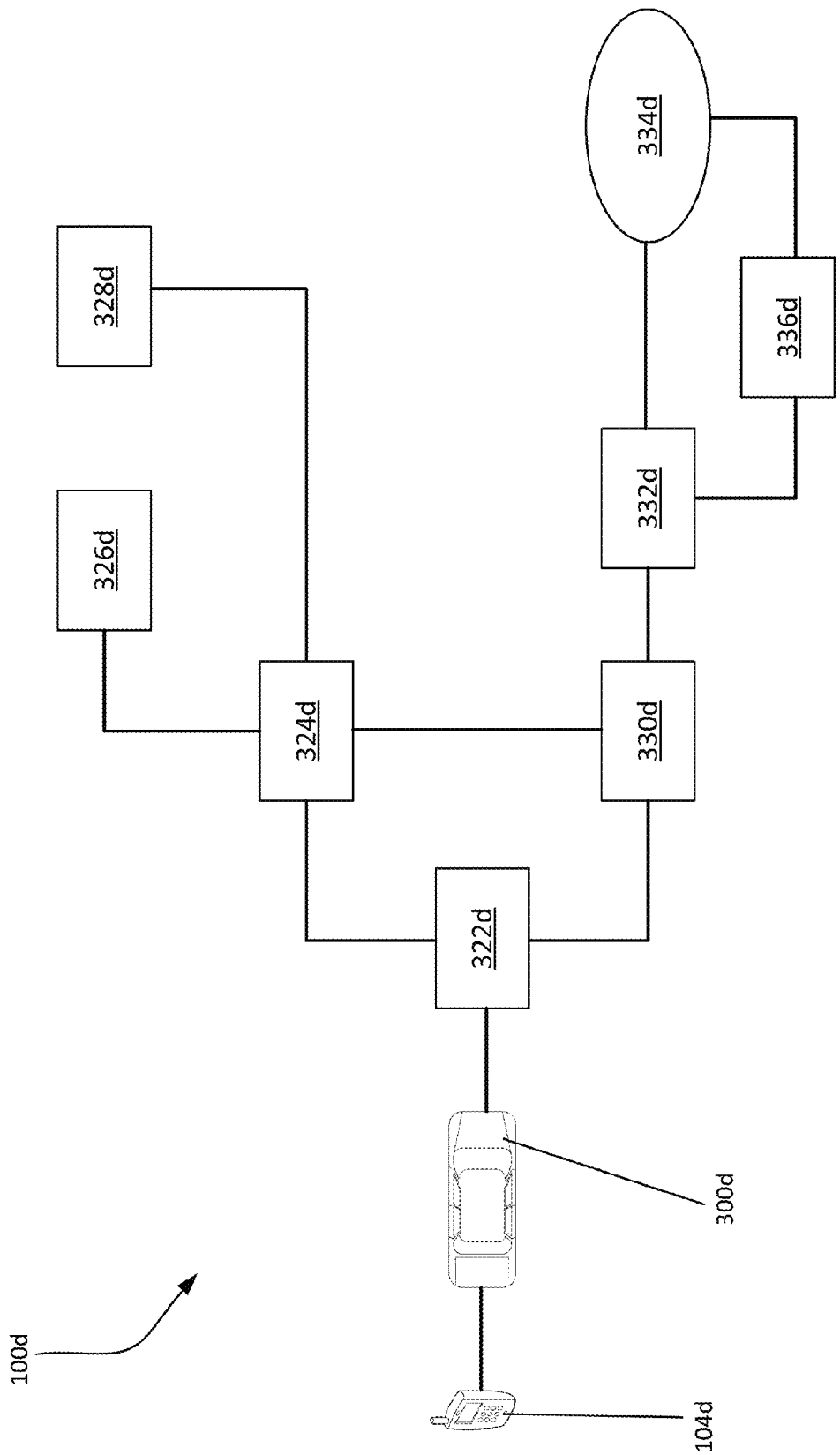
FIG. 12 is a schematic view of a system in accordance with another embodiment.

Referring now to FIG. 12, a schematic representation of a non-limiting example of a system 100d demonstrates how location information of a portable electronic device 104d can be incorporated into the LTE Architecture. The system 100d includes a base station (eNodeB) 322d in the LTE system, a mobility management entity (MME) 324d, evolved serving mobile location centre 326d (E-SMLC), Gateway Mobile Location Centre (GMLC) 328d, serving gateway 330d, a packet data network (PDN) gateway 332d, operator Internet protocol services 334d, and a policy control and charging rule function (PCRF) 336d, The eNodeB 322d is a base station for communicating with the portable electronic device over a wireless transmission link. In the present embodiment, the eNodeB 322d is in communication with the vehicle 300d via a LTE-Uu radio interface between the vehicle 300d and the eNodeB 322d in present embodiment.

The MME 324d is a key control-node in LTE access network. A responsibility of the MME 324d is tracking an idle location of the relay system of the vehicle 300d in the present embodiment. In the present embodiment, the MME 324d is in communication with the eNodeB 322d using a S1-MME interface. In particular, the S1-MME interface can be used to deliver signaling messages between the MME 324d and the eNodeB 322d.

The E-SMLC 326d manages the overall co-ordination and scheduling of resources for the location of the portable electronic device 104d. In particular, the E-SMLC 326d communicates with the portable electronic device 104d, via the MME 324d, the eNodeB 322d, and the relay system in the vehicle 300d, for location services and assistance data delivery using the LTE Positioning Protocol (LPP). In the present embodiment, the E-SMLC 326d is in communication with the MME 324d via a SLs interface.

The LPP is not particularly limited and variations are contemplated. For example, in some embodiments, messages of the LPP can be modified to carry location information of both the vehicle 300d and the portable electronic device 104d.

As another example, messages of the LPP can further be modified to carry information associated with the location relationship between the vehicle 300d and the portable electronic device 104d such as to report a coupling relationship between the vehicle 300d and the portable electronic device 104d to a server. For example, the RequestCapabilities message body in a LPP message can be used by the server to request the device capability information for LPP and the supported individual positioning methods:

```
RequestCapabilities-r9-IEs ::= SEQUENCE {
    commonIEsRequestCapabilities      CommonIEsRequestCapabilities      OPTIONAL,  -- Need ON
    a-gnss-RequestCapabilities        A-GNSS-RequestCapabilities        OPTIONAL,  -- Need ON
    otdoa-RequestCapabilities         OTDOA-RequestCapabilities         OPTIONAL,  -- Need ON
    ecid-RequestCapabilities          ECID-RequestCapabilities          OPTIONAL,  -- Need ON
    relative-pos-RequestCapabilities  RELATIVE-POS-RequestCapabilities  OPTIONAL,  -- Need ON
    epdu-RequestCapabilities          EPDU-Sequence                     OPTIONAL,  -- Need ON
    ...
}
```

In another example, the ProvideCapabilities message body in a LPP message can indicate the LPP capabilities of the target device to the server. The ProvideCapabilities message can be modified to the following:

```
RequestCapabilities-r9-IEs ::= SEQUENCE {
    commonIEsRequestCapabilities      CommonIEsRequestCapabilities      OPTIONAL,  -- Need ON
    a-gnss-RequestCapabilities        A-GNSS-RequestCapabilities        OPTIONAL,  -- Need ON
    otdoa-RequestCapabilities         OTDOA-RequestCapabilities         OPTIONAL,  -- Need ON
    ecid-RequestCapabilities          ECID-RequestCapabilities          OPTIONAL,  -- Need ON
    relative-pos-RequestCapabilities  RELATIVE-POS-RequestCapabilities  OPTIONAL,  -- Need ON
    epdu-RequestCapabilities          EPDU-Sequence                     OPTIONAL,  -- Need ON
    ...
}
```

In another example, the CommonIEsProvideLocationInformation carries common information elements for a Provide Location Information LPP message Type. This message can be modified to include the position of a device relative to the vehicle:

```
CommonIEsProvideLocationInformation ::= SEQUENCE {
    locationEstimate              LocationCoordinates    OPTIONAL,
    velocityEstimate              Velocity               OPTIONAL,
    locationError                 LocationError          OPTIONAL,
    ...
}
LocationCoordinates ::= CHOICE {
    ellipsoidPoint                                Ellipsoid-Point,
    ellipsoidPointWithUncertaintyCircle           Ellipsoid-PointWithUncertaintyCircle,
    ellipsoidPointWithUncertaintyEllipse          EllipsoidPointWithUncertaintyEllipse,
    polygon                                       Polygon,
    ellipsoidPointWithAltitude                    EllipsoidPointWithAltitude,
    ellipsoidPointWithAltitudeAndUncertaintyEllipsoid   EllipsoidPointWithAltitudeAndUncertaintyEllipsoid,
    ellipsoidArc                                  EllipsoidArc,
    relativePosition              {   anchorUEID,
                                      relativePosToAnchor };
    ...
}
Velocity ::= CHOICE {
    horizontalVelocity                            HorizontalVelocity,
    horizontalWithVerticalVelocity                HorizontalWithVerticalVelocity,
    horizontalVelocityWithUncertainty             HorizontalVelocityWithUncertainty,
    horizontalWithVerticalVelocityAndUncertainty  HorizontalWithVerticalVelocityAndUncertainty,
    relativeVelocity              {   anchorUEID,
                                      relativeVelocityToAnchor };
    ...
}
```

The GMLC 328d handles requests for location information from the MME 324d and responds to the requests. In the present embodiment, the GMLC 328d is in communication with the MME 324d via a SLg interface. In particular, the GMLC 328d performs a location service (LCS) subscription authorization function.

The serving gateway 330d is acts as a mobility anchor during a handover from the eNodeB 322d to another eNodeB (not shown). In the present embodiment, the serving gateway 330d is in communication with the eNodeB 322d via a S1-U interface. In addition, the serving gateway 330d is in communication with the MME 324d via a S11 interface.

The PDN gateway 332d provides connectivity from the vehicle 300d to external packet data networks by being the point of exit and entry of traffic for the vehicle 300d. In the present embodiment, the PDN gateway 332d is in communication with the serving gateway 330d via a S5/S8 interface.

The PCRF 336d is a policy manager of 4G LTE technology. The PCRF 336d manages and control data sessions, and provides an interface for a billing and charging system. In the present embodiment, the PCRF 336d is in communication with the PDN gateway 332d via a Gx interface.

In the present embodiment, in addition to storing the location information of vehicle 300d, the E-SMLC 326d can be further configured to receive location information of the portable electronic device 104a associated with the vehicle 300d. It is to be appreciated, with the benefit of this description that location queries can be processed at the E-SMLC 326d generate a notification of whether the portable electronic device 104d is in driver zone of the vehicle 300d. For example, if the portable electronic device 104d is in the driver zone (not shown in this embodiment), when the vehicle 300d is in a curving section of a highway, the response from E-SMLC 326d can be used to redirect an incoming call to a voice mailbox. In other embodiments, the relay system of the vehicle 300d can delay and store a text message for subsequent delivery as described in a previous embodiment.

It is to be appreciated, with the benefit of this specification, that know the location of a portable electronic device 104d in a vehicle 300d can enable future vehicle-related applications and service such as car-to-car or passenger-to-passenger communication or cross-vehicle interaction (sharing or play music/video/photos/games). In some embodiments, third-party services can access the in-car location information to push messages to a portable electronic device 104d in a specific location of the vehicle 300d. For example, toll charge invoices/receipts can be sent to a portable electronic device in the driver zone after the vehicle passes through a toll booth. As another example. tourist/local information can be broadcasted to a portable electronic device in the passenger zone as the vehicle 300d enters a predefined area.

Figure 13:
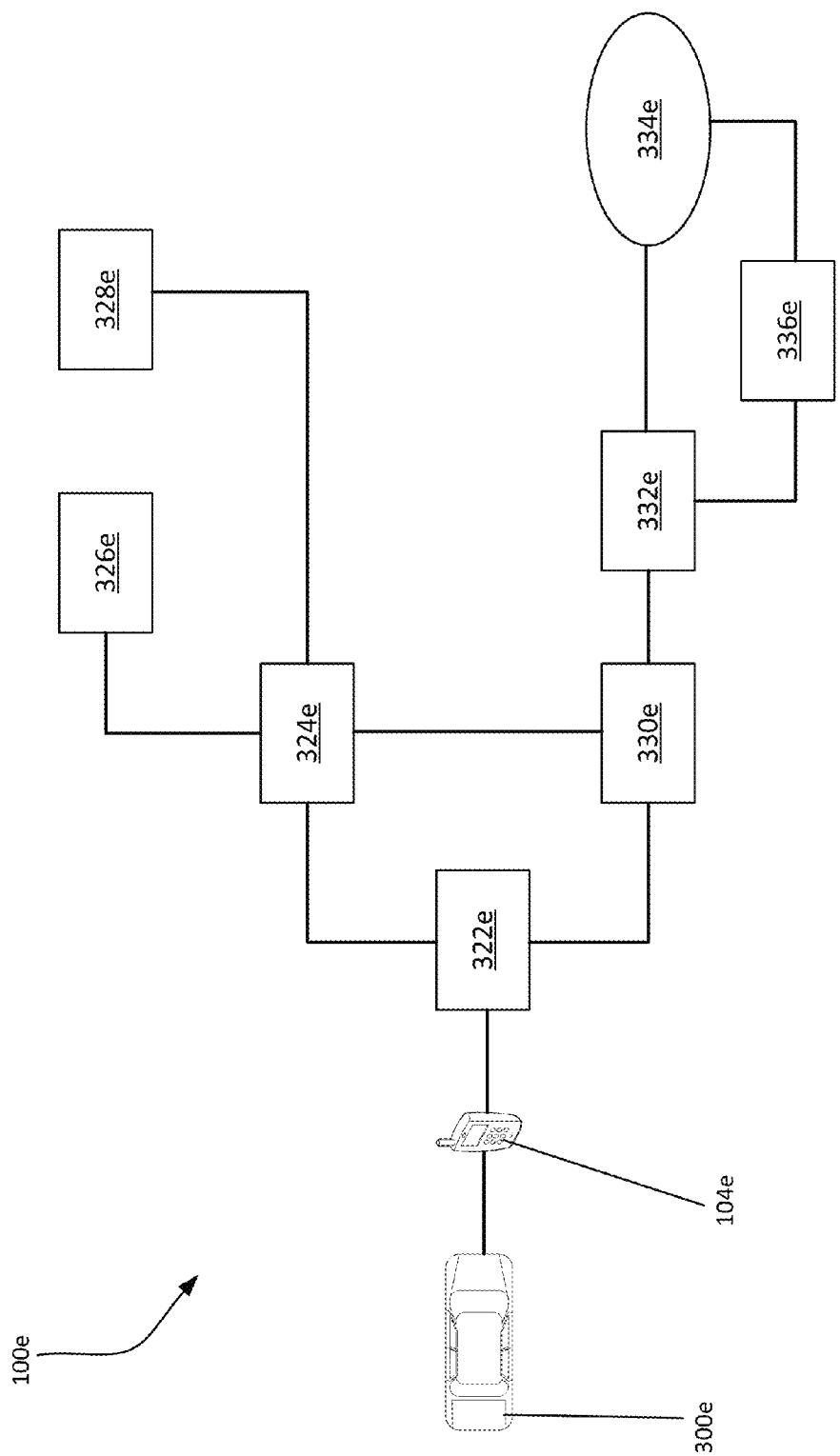
FIG. 13 is a schematic view of a system in accordance with another embodiment.

Referring to FIG. 13, a schematic representation of another non-limiting example of a system 100e for communicating with a portable electronic device is shown. Like components of the system 100e bear like reference to their counterparts in the system 100d, except followed by the suffix "e" instead of "d". The system 100e includes an eNodeB 322e, a MME 324e, an E-SMLC 326e, a GMLC 328e, a serving gateway 330e, a PDN gateway 332e, operator Internet protocol services 334e, and a PCRF 336e.

In the present embodiment, the relay system of the vehicle 300e connects to the eNodeB 322e via the portable electronic device 104e. The portable electronic device 104e establishes a connection with the eNodeB 322e before interacting with the relay system of the vehicle 300e. In this embodiment, it is to be appreciated that the portable electronic device 104e relays the location information of the vehicle 300e to the E-SMLC 326e.

Figure 14:
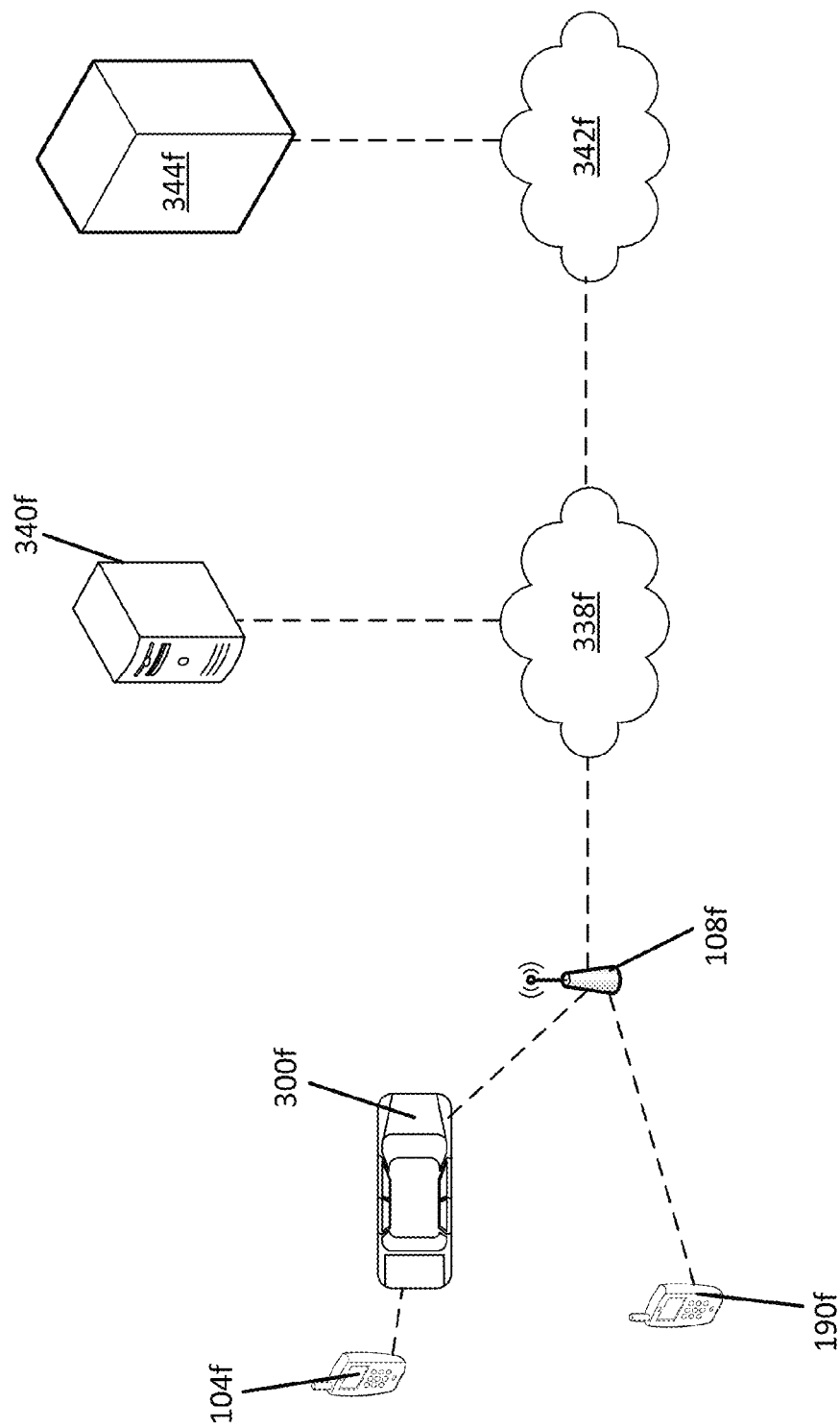
FIG. 14 is a schematic view of a system in accordance with another embodiment.

Referring now to FIG. 14, a schematic representation of another non-limiting example of a system 100f demonstrates how location information can be used to notify a first portable electronic device 190f of the status of a second portable electronic device 104f. The system 100f includes a radio access network 108f, a packet switching (PS) domain 338f, an XML document manager (XDM) server 340f, an IP multimedia subsystem (IMS) domain 342f, and a presence server 344f, In the present embodiment, the radio access network 108*f* is generally configured to provide radio communication between the portable electronic device 190*f* and the PS domain 338*f* as well as between the vehicle 300*f* and the PS domain 338*f*. It is to be appreciated that the type of radio communication is not particularly limited and can include a variety of different types such as those discussed above in connection with previously described embodiments.

The PS domain 338*f* is the backbone packet switching network. In the present embodiment, the PS domain 338*f* is in communication with the radio access network 108*f*.

The XDM server 340*f* is responsible for handling the management of XML documents, such as presence authorization rules, static presence information, contact and group lists (also known as resource lists), policy data, and many others. In the present embodiment, the XDM server 340*f* is in communication with the PS domain 338*f* using the XML configuration access protocol.

The IP multimedia subsystem (IMS) domain 342*f* handles multimedia traffic in the network. In the present embodiment, the IMS domain 342*f* is in communication with the PS domain 338*f* via a session initial protocol (SIP).

The presence server 344*f* is generally configured to determine if the portable electronic device 104*f* is in a driver zone in the present embodiment. The presence server 344*f* is in communication with the IMS domain 342*f* via a link similar to the link connecting the IMS domain 342*f* to the PS domain 338*f*. It is to be appreciated that when a first portable electronic device 190*f* calls the second portable electronic device, the presence server 344*f* can be configured to determine whether features of the second portable electronic device 104*f* should be restricted, such as when it is in a driver zone. If the portable electronic device 104*f* should be restricted, the presence server 344*f* can be configured to send a message to the first portable electronic device 190*f* indicating that the portable electronic device 104*f* is unavailable to receive a call.

While specific embodiments have been described and illustrated, such embodiments should be considered illustrative only and should not serve to limit the accompanying claims.

What is claimed is:

1. A system for communicating with a portable electronic device, the system comprising:
   a plurality of relay antennas mounted to a vehicle, each relay antenna of the plurality of relay antennas configured to communicate with the portable electronic device; and
   a processor in communication with the plurality of relay antennas, the processor configured to relay a communication message between the portable electronic device and a base station, the processor further configured to:
   locate the portable electronic device based on input data received from the plurality of relay antennas; and to
   send location information of the portable electronic device to the base station, the location information including an indication of whether the portable electronic device is located in a driver zone or a passenger zone of the vehicle, the location information configured to trigger a change in messaging behaviour for the portable electronic device at a network device, depending on whether the portable electronic device is located in the driver zone or the passenger zone, and the change in messaging behaviour includes forwarding an incoming call to voicemail or delaying and storing an incoming text message.

2. The system of claim 1, wherein the processor is configured to send a control message to the portable electronic device based on a location of the portable electronic device.

3. The system of claim 2, wherein the control message is for modifying a feature of the portable electronic device.

4. The system of claim 3, wherein the processor is configured to withhold the communication message associated with the modified feature of the portable electronic device, the processor further configured to store the communication message in a memory storage unit.

5. The system of claim 1, further comprising a vehicle interface configured to receive a vehicle message from a vehicle computer.

6. The system of claim 5, wherein the vehicle message provides an indication of a speed of the vehicle.

7. The system of claim 6, wherein the processor is configured to send a control message to the portable electronic device based on a location of the portable electronic device and the speed of the vehicle.

8. The system of claim 7, wherein the control message is for modifying a feature of the portable electronic device.

9. The system of claim 1, further comprising an external antenna in communication with the processor, the external antenna configured to communicate with the base station.

10. The device of claim 1, wherein the processor is further configured to: in response to the sending the location information, receive content customized for the driver zone or the passenger zone depending on whether the portable electronic device is located in the driver zone or the passenger zone.

11. The method of claim 1, further comprising: in response to the sending the location information, receiving content customized for the driver zone or the passenger zone depending on whether the portable electronic device is located in the driver zone or the passenger zone.

12. A method of communicating with a portable electronic device, the method comprising:
   establishing a communication link between the portable electronic device and a plurality of relay antennas via a relay system;
   relaying a communication message between the portable electronic device and a base station using the relay system;
   locating the portable electronic device based on input data from the plurality of relay antennas; and
   sending location information of the portable electronic device from the relay system to the base station, the location information including an indication of whether the portable electronic device is located in a driver zone or a passenger zone of a vehicle, the location information configured to trigger a change in messaging behaviour for the portable electronic device at a network device, depending on whether the portable electronic device is located in the driver zone or the passenger zone, and the change in messaging behaviour includes forwarding an incoming call to voicemail or delaying and storing an incoming text message.

13. The method of claim 12, further comprising executing a control command at the portable electronic device based on a location of the portable electronic device.

14. The method of claim 13, wherein sending the control message is for modifying a feature of the portable electronic device.

15. The method of claim 14, further comprising withholding the communication message associated with the modified feature of the portable electronic device.

16. The method of claim 15, further comprising storing the withheld communication message in the memory storage unit.

17. The method of claim 12, further comprising receiving a vehicle message from a vehicle computer.

18. The method of claim 17, wherein the vehicle message provides an indication of a speed of the vehicle.

19. The method of claim 18, further comprising sending a control message to the portable electronic device based on a location of the portable electronic device and the speed of the vehicle.

20. The method of claim 12, further comprising communicating with the base station using an external antenna.

* * * * *